(12) United States Patent
Bordogna et al.

(10) Patent No.: US 6,301,228 B1
(45) Date of Patent: *Oct. 9, 2001

(54) METHOD AND APPARATUS FOR SWITCHING SIGNALS USING AN EMBEDDED GROUP SIGNAL STATUS

(75) Inventors: Mark Aldo Bordogna, North Andover, MA (US); Philip Sidney Dietz, East Hampstead, NH (US); Joseph Elide Landry, Atkinson, NH (US); Jeffrey Robert Towne, Litchfield, NH (US); Warren Clifton Trested, Jr., E. Hampstead, NH (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/087,067

(22) Filed: May 29, 1998

(51) Int. Cl.[7] ............................................. H04N 1/16
(52) U.S. Cl. ................................ 370/244; 370/537
(58) Field of Search ............................ 370/216, 225, 370/241, 242, 243–46, 248, 249, 250, 251, 252, 351, 389, 392, 465, 537, 541, 538, 539; 709/224; 714/709, 715–17, 799, 800–1, 47, 48

(56) References Cited

U.S. PATENT DOCUMENTS

| | | | |
|---|---|---|---|
| 4,847,877 | 7/1989 | Besseyre | 375/116 |
| 5,008,882 | 4/1991 | Peterson et al. | 370/94.3 |
| 5,151,902 | 9/1992 | Grallert | 371/51 |
| 5,465,256 | 11/1995 | Fowler | 370/110.1 |
| 5,555,477 | 9/1996 | Tomooka et al. | 359/115 |
| 5,636,203 | 6/1997 | Shah | 370/244 |
| 5,721,727 | 2/1998 | Ashi et al. | 370/244 |
| 5,838,684 | 11/1998 | Wicki et al. | 370/416 |

FOREIGN PATENT DOCUMENTS

| | | | |
|---|---|---|---|
| 0 579 040 A2 | 1/1994 | (EP) | H04Q/3/00 |
| 0 721 275 A2 | 7/1996 | (EP) | H04M/3/36 |
| 0 824 292 | 2/1998 | (EP) . | |
| 0 840 472 A2 | 5/1998 | (EP) | H04J/3/14 |
| WO/9742729 | 11/1997 | (WO) . | |

OTHER PUBLICATIONS

Anderson, J. et al., "Virtual Path Group Protection Switching–A Method for Fast ATM Network Survivability", Bell Labs Technical *Journal*, Spring 1997, vol. 2, No. 2, pp. 213–232.

Wu, T–H, "Emerging Technologies for Fiber Network Survivability", *IEEE Communications Magazine*, vol. 33, Feb. 1995, No. 2 pp. 58–59, 62–74.

ITU–T Recommendation G.783, "Characteristics of Synchronous Digital Hierarchy (SDH) Equipment Functional Blocks", Jan., 1994 pg. 61, Annex A.

*Primary Examiner*—David R. Vincent
(74) *Attorney, Agent, or Firm*—Gregory J. Murgia

(57) ABSTRACT

A simple, elementary switch fabric is provided for switching individual signals as a composite group based on group signal status that is embedded and carried within each of the individual signals in the group. In general, a group signal status is derived for a group based on the signal status of each of the individual signals within that group. This group signal status is then individually encoded and embedded in each of the individual signals in the group. The embedded group signal status can be extracted and decoded at any point within the transmission path, as necessary, to facilitate appropriate switching decisions. Although each individual signal is switched independently by the elementary switch fabric, the individual signals are effectively switched as a composite group because the switching decision for each individual signal in the group is based on the same group signal status. That is, individual signals in a particular group will either be selected or rejected together as a single, composite group.

24 Claims, 5 Drawing Sheets

METHOD AND APPARATUS FOR SWITCHING SIGNALS USING AN EMBEDDED GROUP SIGNAL STATUS

CROSS REFERENCE TO RELATED APPLICATION

This application is related to our co-pending U.S. patent application, Ser. No. 08/942,095, filed on Oct. 1, 1997 and Ser. No. 08/942,096, filed on Oct. 1, 1997.

FIELD OF THE INVENTION

This invention relates generally to digital transmission networks and, more particularly, to embedded control of groups of individual signals transported through digital transmission networks.

BACKGROUND OF THE INVENTION

Digital transmission networks, such as those based on Synchronous Optical Network/Synchronous Digital Hierarchy (SONET/SDH) standards, are used extensively for transporting broadband communications signals. In some applications, these broadband communications signals may include base rate signals, which are signals having a fundamental rate or structure. Base rate signals are typically combined with other similar base rate signals to create a higher rate and more complex signal. Using SONET as an example, a synchronous transport signal (STS-1) having a fundamental rate of 51.84 Mbps may be a base rate signal, and an STS-12 signal may comprise twelve (12) individual STS-1 signals to form a base rate signal group (BRSG) having a composite rate of 622.08 Mbps.

To achieve transmission efficiencies as well as other performance advantages, it is desirable in some applications to switch individual signals as a single, composite group rather than on an individual basis. For example, it may be advantageous to maintain equalized or uniform path delay for signals that are transported through a network. Moreover, it may also be desirable to perform group switching based on selected performance-related attributes, such as signal quality, which can be conveyed in the form of signal status for each of the signals. Building on the previous SONET example in a switching application, it may be desirable to switch the entire STS-12 base rate signal group as a composite, higher rate signal through the network rather than individually switching each of the lower rate STS-1 signals within that STS-12 signal group. In the prior art, complex group switches are typically used for this purpose.

Complex group switches are known to have a complex switching structure comprising multiple, cascaded selection/switching stages with highly coupled and complex control structures. In order for the complex group switch to appropriately switch individual signals as a composite group, the signal status for each of the individual signals must be resolved to derive a group status at each particular selection/switching stage. This resolution of signal status adds excessive processing overhead which results in undesirable switching delays during signal transmission.

Out-of-band control techniques, which are typically used in prior art group switches to resolve group signal status, can also add further complexity to a group switch. For example, each selection stage in a prior art group switch will typically require its own complex control structure to provide group status information. The control structures for each selection/switching stage must also be closely coupled to preserve the group status as signals are transported through the stages. Additionally, an overall control structure may also be required to couple the control structures from each individual selection/switching stage along the transmission path. It is also known that the complexity of control increases significantly for configurations having distributed switching elements spanning multiple selection/switching stages.

SUMMARY OF THE INVENTION

Undesirable switching delays and other problems associated with complex control schemes used for group switching are substantially eliminated in accordance with the principles of the invention by computing a group signal status as a function of the signal status of individual signals in a group, embedding the group signal status in each of the individual signals in a group, and independently selecting each of the individual signals in a respective group as a function of the embedded group signal status using an elementary switch fabric. Although each individual signal in the group is independently selected, the individual signals are effectively switched as a composite group through the elementary switch fabric because the selection decisions are based on the same group signal status carried by each of the individual signals in a group. As such, all individual signals in the group are either selected or rejected together as a composite group.

In one illustrative embodiment, an independent signal monitor analyzes and reports the signal status of each individual base rate signal to a group status logic element which computes a group signal status for each respective base rate signal group. The group signal status is then embedded in the corresponding individual base rate signals by status encoding elements so that the group signal status propagates along with each of the individual base rate signals through the transmission path. At any point in the transmission path, the group signal status can be extracted from the individual base rate signals by status decoding elements. Control logic processes the decoded group signal status and provides the appropriate control signals to the elementary switch fabric to control the selection of the individual base rate signals. The elementary switch fabric is an m×n base rate signal selector switch comprising m individual base rate selectors capable of switching n base rate signal groups each having m channels. More specifically, each of the m individual base rate selectors corresponds to one of the m channels and selects a base rate signal for its channel from one of the n base rate signal groups. Because all individual base rate signals within a base rate signal group carry the same group signal status, the individual base rate selectors in the elementary switch fabric can perform the equivalent function of a group switch but without the complexity of prior art arrangements.

Although overhead is a factor in transmitting group signal status with each individual signal, improved switching efficiencies are achieved according to the principles of the invention by using a less complex control structure and a simpler elementary switch fabric as compared with prior art group switches. In particular, front-end processing logic is much simpler than in prior art complex group switches which have multiple selection stages and which require resolution of group status within each stage. Moreover, by encoding and propagating group signal status within each of the individual signals in a particular group, group signal status is locally available and directly extractable at each selection point in the transmission path. As a result, switching delays are avoided since derivation of signal status for each and every signal in the group is not required to formulate group signal status at each selection point.

BRIEF DESCRIPTION OF THE DRAWING

A more complete understanding of the invention may be obtained by reading the following description of specific illustrative embodiments of the invention in conjunction with the appended drawing, with like elements referenced with like references, in which.

DETAILED DESCRIPTION

It is well known that protection switching schemes are typically used in SONET/SDH networks so that communications can be maintained even if there are intermittent faults, outages, or failures on a given transmission path. Some examples of the types of network protection switching schemes used in SONET/SDH include: bi-directional line switched ring (BLSR), unidirectional path switched ring (UPSR), dual ring interworking (DRI), and 1+1 facility protection to name a few. Although the illustrative embodiments described herein are particularly well-suited for a "path-in-line" protection switching application in a SONET/SDH-based transmission network, and shall be described in that exemplary context for this application, those skilled in the art will understand from the teachings herein that the principles of the invention may also be employed in many other embedded control applications.

In the context of the following detailed description, the terms "routing", "switching", "selecting" and "connecting" are used interchangeably to refer to the handling of signals within a transmission path. Additionally, the term "switch fabric" is intended to encompass all the various routing structures known in the art that are used for routing, switching, or connecting signals. Although selector-based switch fabrics are described and shown in the following detailed description and accompanying figures, it should be noted that many types of routing structures having complex hardware and/or software implementations are contemplated for the elementary switch fabric used in the illustrative embodiments described and shown herein. Examples could include an array of hardware selectors, link lists, as well as other implementations known to those skilled in the art.

It is also to be understood that any specific SONET terminology that is used throughout the detailed description is only intended to be illustrative of one exemplary application. As an example, the terms base rate signal (BRS) and base rate signal group (BRSG) are used throughout the detailed description to refer to the types of signals that can be accommodated by the illustrative embodiments of the invention. As used, a base rate signal (BRS) is meant to describe a signal of a fundamental rate or structure, which could also be combined with other similar base signals (BRS) to create a higher rate and/or more complex signal, such as a base rate signal group (BRSG). Using SONET as an example, a base rate signal (BRS) could be an STS-1 signal having a fundamental rate of 51.84 Mbps, while an STS-12 signal could represent a base rate signal group (BRSG) comprising 12 STS-1 signals with a composite rate of 622.08 Mbps. Those skilled in the art will also be able to identify other types of signals which may used in the illustrative embodiments described herein, either because of characteristics relating to rate or structure. In ATM, for example, where rate is not necessarily the important consideration, an analogous fundamental structure may be a physical channel comprising a plurality of virtual paths (VPs).

Figure 1:
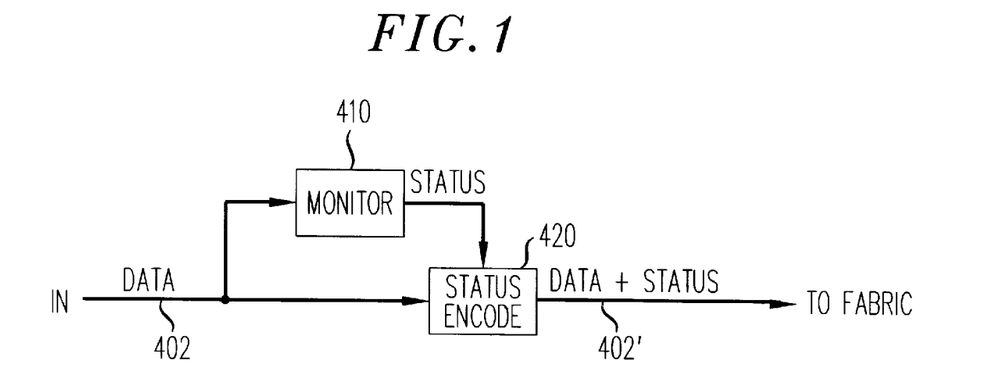
FIG. 1 shows a simplified block diagram of one illustrative embodiment for embedding signal status according to the principles of the invention.

FIG. 1 shows in simplified form one illustrative embodiment for embedding status within an input signal according to the principles of the invention. In general, an input signal 402 is provided to both a signal monitoring element 410 and to a status encoding element 420. Based on predetermined failure conditions or other given performance criteria, signal monitoring element 410 supplies a signal status to status encoding element 420. Status encoding element 420 embeds the signal status information provided by signal monitoring element 410 and supplies the data from the input signal along with its embedded signal status information as output signal 402'. Those skilled in the art will recognize that signal monitoring element 410 and status encoding element 420 can be implemented using techniques well known in the art. By way of example only, signal status can be combined with signal data in many different ways, such as by using a telemetry channel, or by modulating the amplitude, frequency, or phase of the signal data, to name a few.

As shown in FIG. 1, the input signal 402 includes data while the output signal 402' includes data plus embedded signal status information. By embedding signal status information along with the data, it becomes apparent that additional overhead is therefore added to the signal. However, various techniques known to those skilled in the art can be used to accommodate the additional overhead requirements consistent with the teachings herein. Using a SONET transmission application as an example, the additional embedded signal status can be carried in unused overhead bytes. Another approach may be to increase the bit rate of transmission, thereby increasing the number of available time slots for transmitting the additional overhead. Other known techniques are also contemplated for use in the invention.

Figure 2:
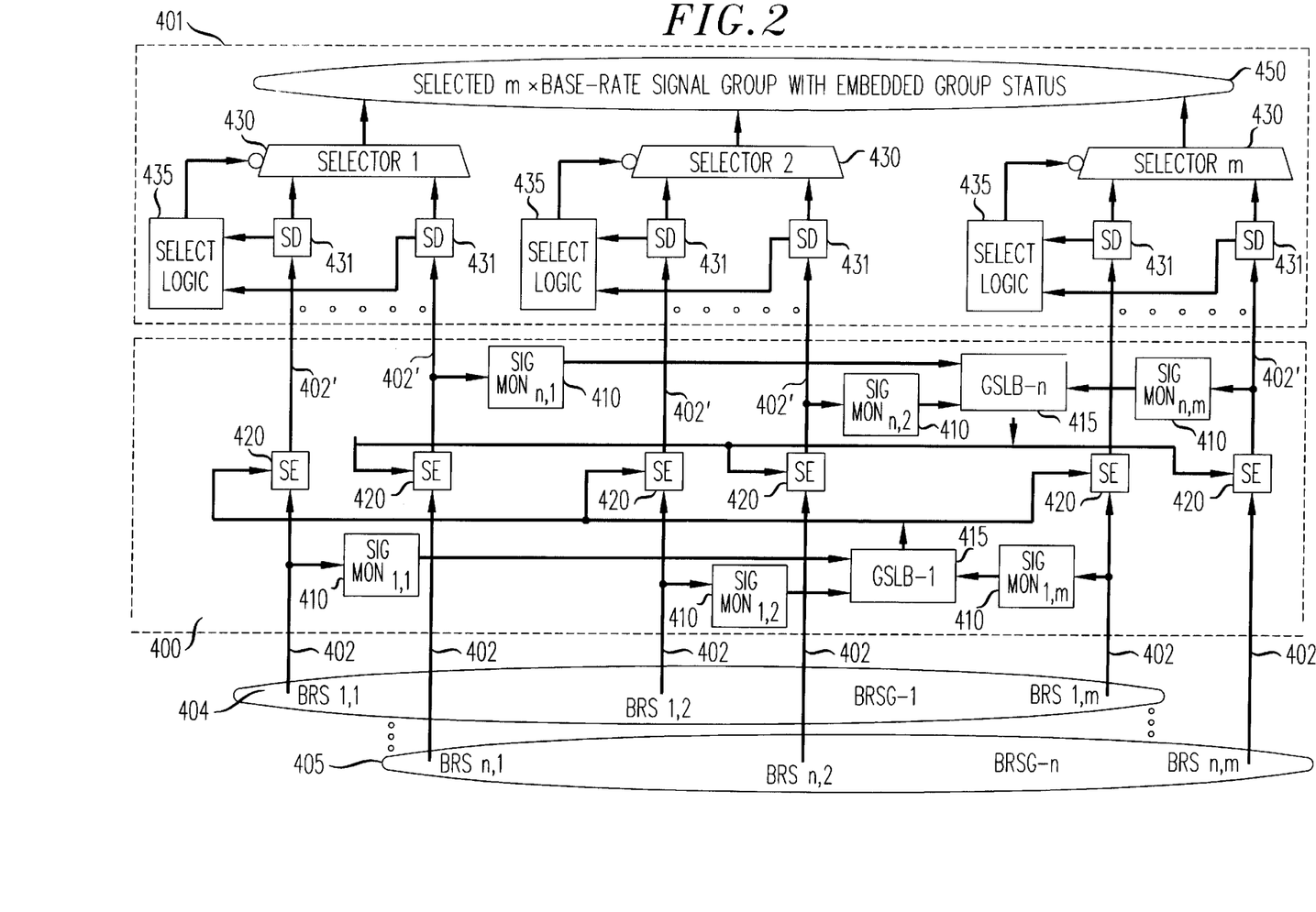
FIG. 2 shows a simplified block diagram of one illustrative embodiment according to the principles of the invention.

FIG. 2 shows one illustrative embodiment of an apparatus in the context of digital transmission networks according to the principles of the invention. A signal interface portion 400 receives a plurality of base rate signal groups 404, 405 each including a plurality of individual base rate signals 402. In the example shown in FIG. 2, a base rate signal group comprises m base rate signals. For example, the first base rate signal group BRSG-1, shown as group 404, comprises m base rate signals $BRS_{1,1}$ through $BRS_{1,m}$. Similarly, the nth base rate signal group BRSG-n, shown as group 405, comprises $BRS_{n,1}$ through $BRS_{n,m}$. In order to simplify the drawing, BRSG-2 through BRSG-(n−1) have been omitted.

Interface portion 400 includes a plurality of signal monitoring elements 410, group status logic blocks 415, and status encoding elements 420 for embedding group signal status information within each of the individual base rate signals 402 in the corresponding groups 404, 405. As shown, individual 402' represent the original base rate signals 402 with the additional embedded signal status added within interface portion 400.

In operation, an independent signal monitor 410 analyzes and reports the signal quality (or other selected attribute) for each base rate signal 402 in a respective group to a common group status logic block 415. As shown, each group status logic block 415 corresponds to one of the groups. For example, GSLB-1 corresponds to BRSG-1 and GSLB-n corresponds to BRSG-n. Generally, each group status logic block 415 is a logic configuration that blends or computes the quality, or other status information, of each base rate signal in a group. In particular, each group status logic block 415 creates a common group status for its respective base rate signal group. Using group 404 as an example, signal monitors 410, shown here as SIG $MON_{1,1}$ through SIG $MON_{1,m}$, correspond to base rate signals $BRS_{1,1}$ through $BRS_{1,m}$ in group 404. Outputs from SIG $MON_{1,1}$ through SIG $MON_{1,m}$ are provided to GSLB-1, which in turn computes a common group status based on the individual signal status reported for each of the base rate signals in that group. This common group status is then encoded within each of the base rate signals for the corresponding group 404 using signal encoding elements 420. From this point forward in the transmission path, each of the base rate signals carries forward the status of the group to which they belong. As will be described in further detail below, it should be noted that each of the base rate signals can also carry its own individual signal status in addition to the common group status.

Signal switch portion 401 includes a plurality of status decoding elements 431 for decoding group signal status information embedded within each of individual base rate signals 402'. Signal switch portion 401 further includes a plurality of elementary base rate selectors 430 which select the appropriate individual base rate signals 402' based on a control signal supplied by a corresponding select logic element 435. As shown, signal switch portion 401 is an m-channel base-rate signal selector switch having m selectors 430 for selecting the corresponding base rate signals to be provided as output in the m-channel base rate signal group 450. Because group status is embedded within each of the individual base rate signals 402' for a particular group, an elementary base rate switch architecture comprising individual base rate selectors 430 can therefore switch an entire group.

In operation, base rate signals $BRS_{1,1}$ through $BRS_{1,m}$ and $BRS_{n,1}$ through $BRS_{n,m}$ with their respective embedded group signal statuses, shown here as base rate signals 402', are provided as input to signal switch portion 401. Status decoding elements 431 receive base rate signals 402', decode the encoded group status information if necessary, and pass the decoded group status information on to select logic element 435. Base rate signals 402' are also provided as input to base rate selectors 430. Select logic element 435 evaluates the quality and/or status of all inputs associated with the base rate selector 430 under its control and provides an appropriate control signal to enable base rate selector 430 to choose the most appropriate input in accordance with the embedded group signal status and the selection criteria. More specifically, each base rate selector 430 selects a base rate signal corresponding to one channel of the base rate signal group 450 which is provided as output from signal switch portion 401. Each base rate selector 430 receives, as input, one base rate signal from each of the groups (BRSG-1 through BRSG-n). Because there are n base rate signal groups, each base rate selector 430 will therefore receive n base rate signal inputs from which to select.

Although base rate signals are selected individually by base rate selectors 430 for each of the m channels, in effect, an entire base rate signal group is selected because the selection decision at each base rate selector 430 is based on the same group signal status that is carried by each individual base rate signal in a respective group. Stated otherwise, although each base rate selector 430 independently selects a base rate signal, all base rate selectors 430 will select a base rate signal corresponding to the same base rate signal group. For example, if group 404 is to be selected and switched as output base rate signal group 450 based on the selection criteria, then SELECTOR 1 will select $BRS_{1,1}$, SELECTOR 2 will select $BRS_{1,2}$, and SELECTOR m will select $BRS_{1,m}$. Consequently, the individual base rate signals are switched as a composite group so that a switching decision for each of the individual base rate signals, in effect, represents a switching decision for the entire group. The complexity of prior art group switches is therefore avoided because an elementary base rate signal architecture having base rate selectors can be used to perform the group switching function.

By embedding group signal status information, much simpler front-end processing logic is used as compared with prior art complex group switches that require the resolution of group status across multiple stages of switching elements. Moreover, base rate signal switching stages can be cascaded in the illustrative embodiments of the invention without any added complexity to manage group switching. Namely, the control scheme does not have to be changed if additional switching stages are added, because group signal status is already resolved and transported with each individual signal within a group. Referring back to FIG. 2, group signal status is encoded via status encoding elements 420 and propagates along the transmission path in such a way that the group signal status is extractable and usable at subsequent switching stages if required. As such, the illustrative embodiments of the invention would be particularly well-suited for protection switching applications in digital transmission networks because groups of signals could be protection switched between active and standby transmission paths using existing elementary switch fabrics.

Figure 3A:
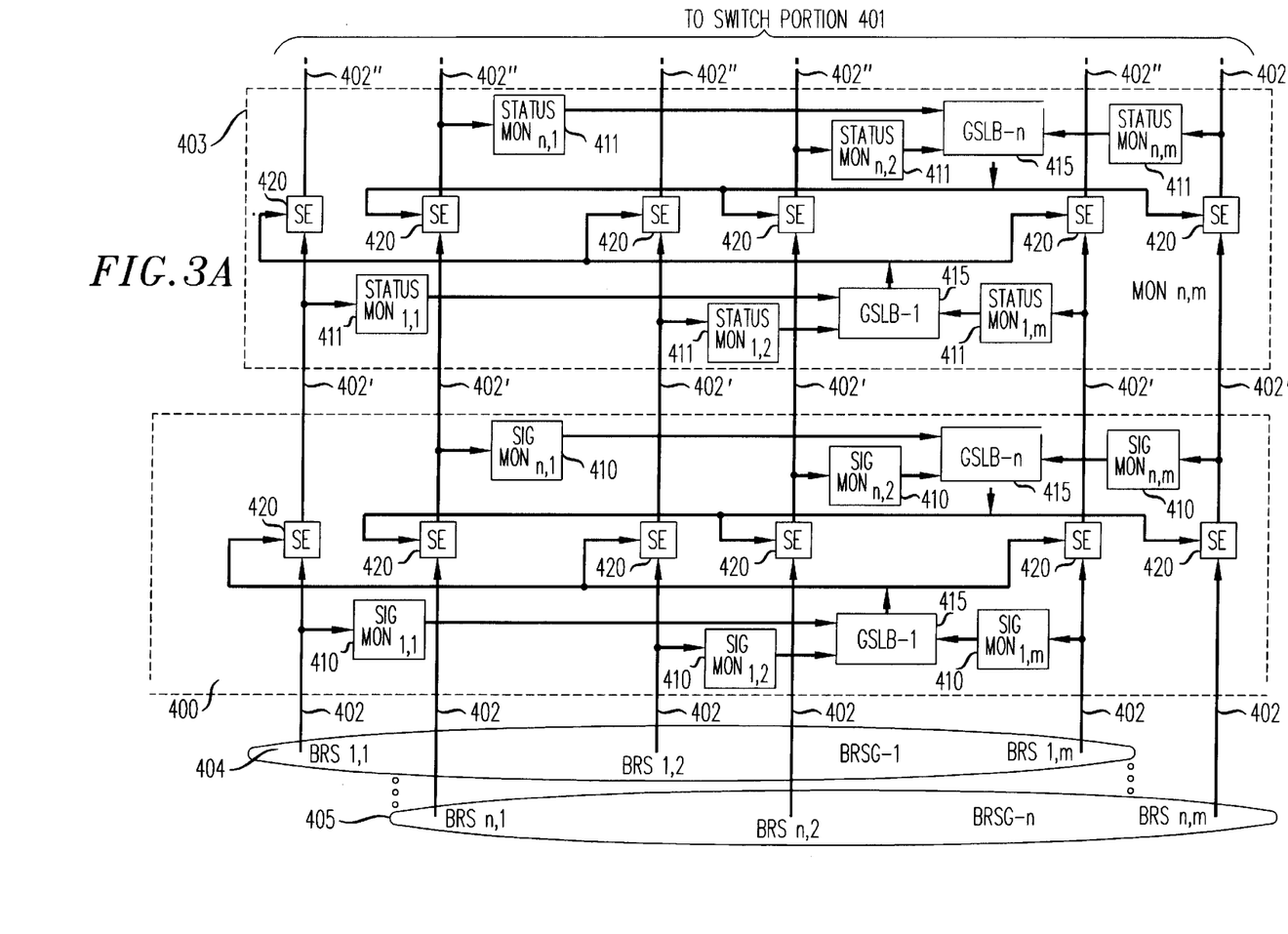
FIGS. 3A and 3B show simplified block diagrams of another illustrative embodiment according to the principles of the invention.
Figure 3B:
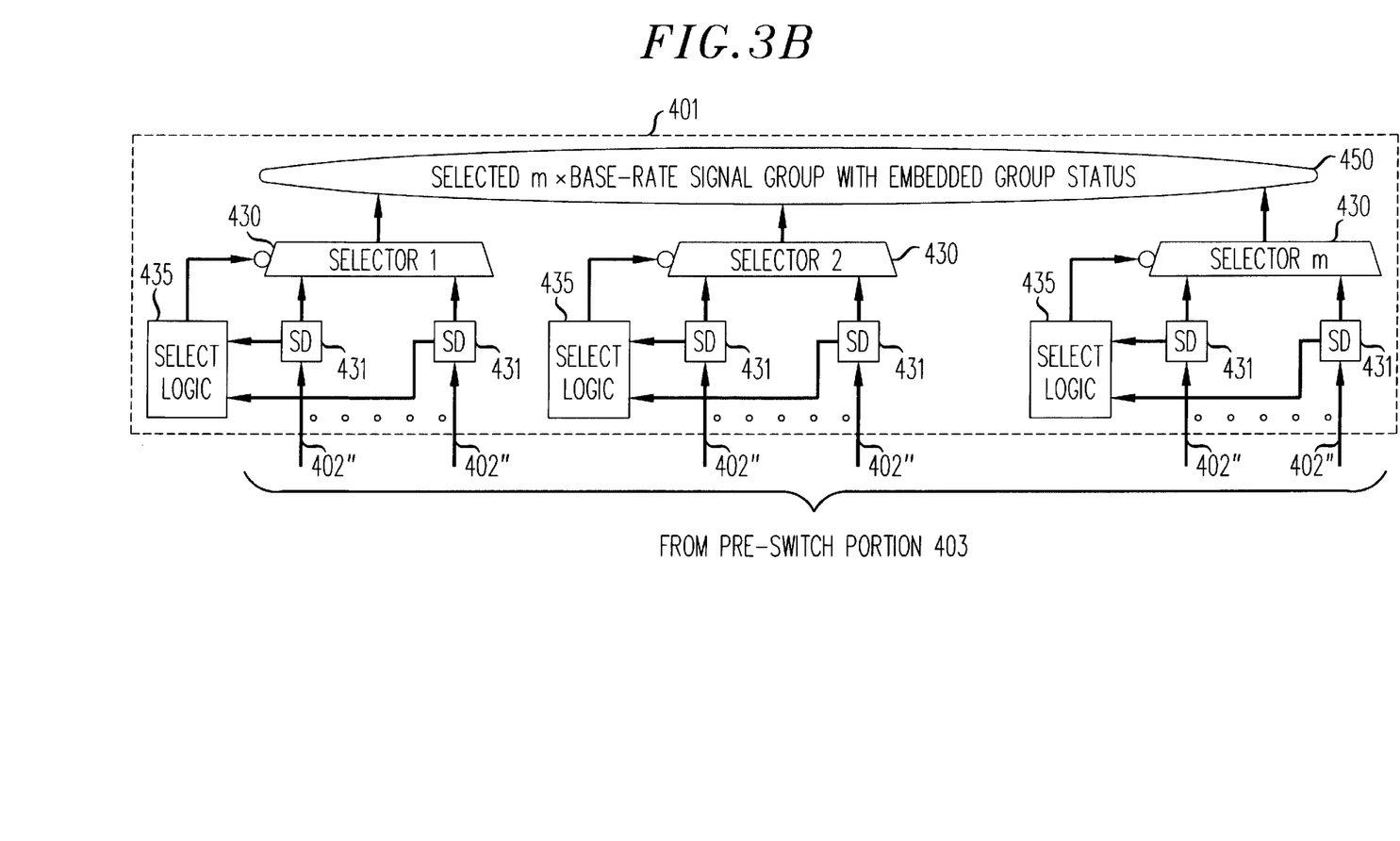

FIGS. 3A and 3B show another embodiment in which multiple levels and types of group signal status may be embedded within the individual base rate signals. It should be noted that many of the features shown in FIGS. 3A and 3B are the same as those depicted in FIG. 2. Specifically, signal switch portion 401 shown in FIG. 3B includes the same types of components and functionality as described for the embodiment shown in FIG. 2. In FIG. 3A, a pre-switch portion 403 has been added in addition to interface portion 400. It should be noted that any number of interface portions 400 or pre-switch portions 403 can be used in accordance with the teachings herein.

Generally, pre-switch portion 403 can be any intermediate stage between interface portion 400 (FIG. 3A) and switch portion 401 (FIG. 3B) where additional status insertion is desired. In one exemplary configuration, interface portion 400 may represent the fundamental interface point of the system, e.g., an external entry point where input signals are interrogated to derive raw signal status attributes. Alternatively, interface portion 400 may represent a subsequent interface point within the system. In either case, pre-switch portion 403 may then be used for additional status insertion prior to switch portion 401. For example, pre-switch portion 403 may be used to monitor the group status that is carried by the individual signals in order to compute or derive a secondary group signal status.

In the particular embodiment shown in FIG. 3A, pre-switch portion 403 includes a number of status monitoring/decoding elements 411, shown here as STATUS $MON_{1,1}$ through STATUS $MON_{1,m}$ and STATUS $MON_{n,1}$ through STATUS $MON_{n,m}$, which monitor the individual base rate signals 402' for embedded group signal status that is inserted in a previous stage, e.g., at a previous interface portion 400. In contrast to the signal monitoring elements 410 of FIGS. 1 and 2, the status monitoring/decoding elements 411 are used to monitor for group status generated by a previous group status logic block and to decode this group status for processing by another group status logic block in pre-switch portion 403. The group status logic block (GSLB) in pre-switch portion 403 could then generate a new group status (e.g., a secondary group status), which could then be encoded along with the previous group status in each of the individual signals via status encoding elements 420 as previously described. As shown in FIGS. 3A and 3B, individual signals 402" now carry status inserted by interface portion 400 and pre-switch portion 403 and are provided as input to switch portion 401. In effect, an aggregate group status generated through interface portions 400 and pre-switch portions 403 can be carried within each base rate signal in a base rate signal group. Group status logic blocks therefore can be used to combine group signal status for a base rate signal group based on either monitored signal status or previously encoded group signal status.

Pre-switch portion 403 may also be used to insert some form of control to the input signal to bring about a desired result. By way of example only, this control insertion could include a command request, e.g., a manual switch request, or a test insertion request, and the like. Therefore, group signal status carried by each individual base rate signal can be used to propagate control information. For example, a manual switch request can be embedded within any of the individual base rate signals in a group. Each of the other individual base rate signals in that same group could then be updated to carry this same manual switch request. As the individual base rate signals propagate through the transmission path to select logic elements 435, the switch request carried by the base rate signals in the group would be appropriately implemented in each of the corresponding selectors 430. In effect, the manual switch request generated for one of the individual base rate signals would result in the appropriate action for the entire group.

Figure 4:
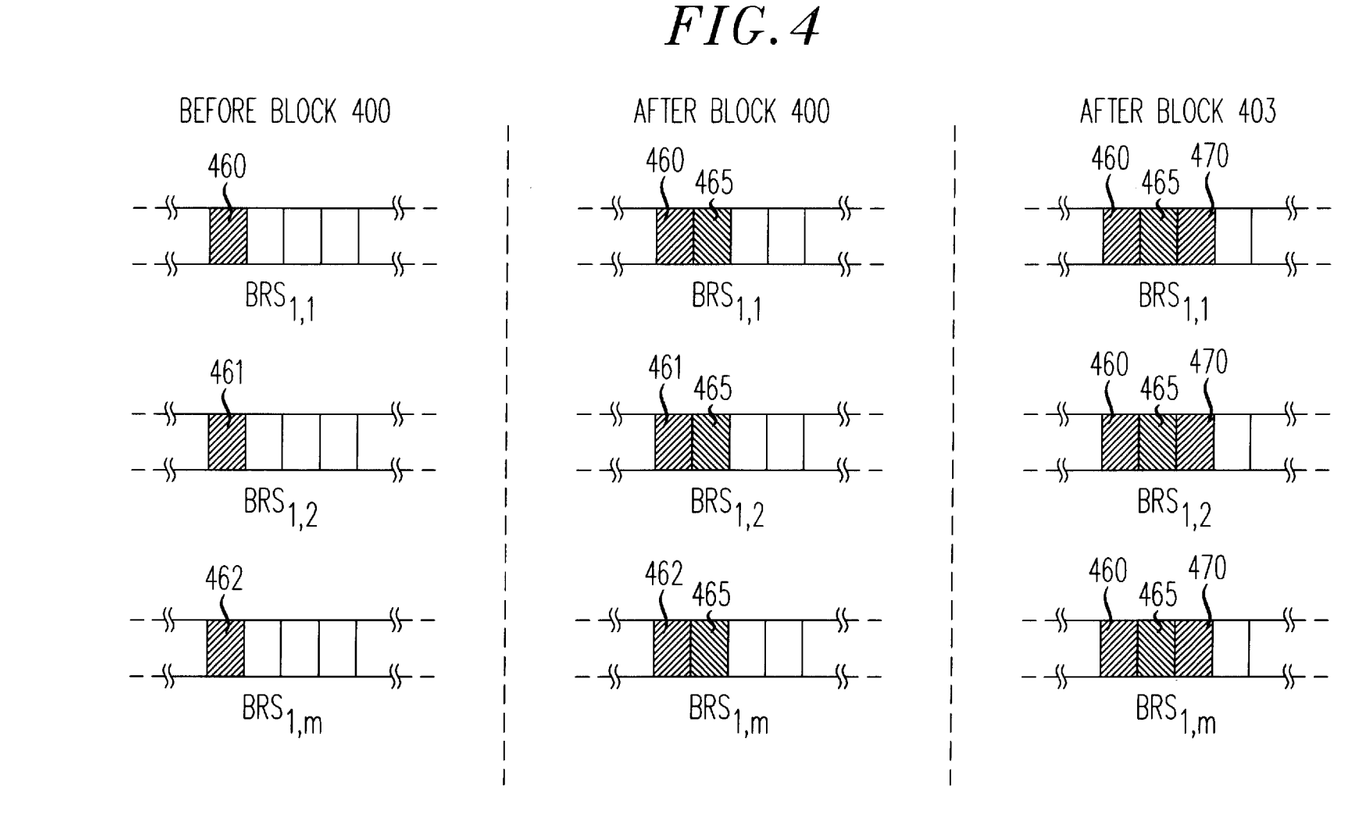
FIG. 4 shows a simplified diagram illustrating the insertion of signal status according to the principles of the invention.

As shown in FIG. 4, each individual base rate signal can carry multiple layers of signal status, which may include the individual signal status for that particular base rate signal in addition to group signal status provided by group status logic blocks. The use of multiple layers of signal status is described in co-pending U.S. patent application entitled "A Control Architecture Using a Multi-Layer Embedded Signal Status Protocol", (Bordogna 2-5-6-5-6), Ser. No. 09/123,086, which is herein incorporated by reference. With this capability, multiple selection decisions can be made at any point in the transmission path based on either individual base rate signal status or group signal status, both of which can propagate through the transmission path along with the individual base rate signal.

More specifically, FIG. 4 illustrates one simplified example of how signal status information can be progressively added to base rate signals in a particular group according to the embodiment shown in FIG. 3A. In this example, interface portion 400 is meant to represent a subsequent interface point within the system as opposed to a fundamental interface point as previously described. For ease of illustration, only base rate signals $BRS_{1,1}$ through $BRS_{1,m}$ in BRSG-1 are shown. Prior to entering interface portion 400, the base rate signals could each carry their own individual signal status, shown here 460 for $BRS_{1,1}$, 461 for $BRS_{1,2}$, and 462 for $BRS_{1,m}$. After propagating through interface portion 400, each of the base rate signals carries its own individual signal status as described above in addition to a group signal status, shown here as 465. As shown, each base rate signal in BRSG-1 includes the same group signal status 465. After being processed through pre-switch portion 403, each of the base rate signals is shown to carry its own individual signal status (460, 461, 462), group signal status 465 for BRSG-1, as well as another group signal status 470. By way of example, this other group signal status 470 may represent a group status based on a different selection parameter or may represent a group status corresponding to a larger multiplexed group as described below.

According to another aspect of the invention, individual signal status can be advantageously used to reconstruct signal groups without adding any complexity to the control structure. For example, the number of groups or composition of groups may change as signals are transported through a network, e.g., as a result of multiplexing/demultiplexing, switching, or cross-connect operations. Consequently, existing groups may be deleted or modified and new groups may be created, thus rendering a previous group signal status as invalid or inaccurate. According to the principles of the invention, a new group signal status can be easily computed for the newly created or modified group using the individual signal status that is still being carried by each of the individual base rate signals.

The multiple layers of group signal status can also be advantageously used in a variety of multiplexing applications. For example, individual signals may be multiplexed to form a signal group, which may then be multiplexed with other signal groups to form larger signal groups. Each individual signal may then carry its own individual signal status as well as multiple levels of group signal status for each signal group to which it belongs. Illustratively, a multiplexing operation may multiplex two groups, group A and group B, to form a larger group C. Therefore, an individual signal within group A could carry its own individual signal status, a group status for group A, and a group status for group C. The principles of the invention would be particularly applicable and useful for inverse multiplexing applications where higher rate signals are segmented and transported over a number of smaller size tributaries. In this type of application, it may be essential to maintain uniform or equalized delay among all the smaller size tributaries to ensure proper reassembly of the higher rate signal at some subsequent point in the transmission path. Accordingly, lower rate constituent tributaries could be switched as a composite group while ensuring uniform or equalized delay.

It will become apparent from the teachings herein that the combination of group signal status and multiple level signal status capability allows for a great deal of implementation flexibility in terms of computing group signal status and selecting signals. In one possible implementation, group signal status can be defined with a non-null (e.g., purposeful) value if individual signal status is carried by all individual base rate signals in the group. A subsequent selection would then be based on the non-null group signal status. If group signal status is assigned a null value, a subsequent selection would only then be based on the individual signal status of the base rate signals. In an implementation where base rate signals carry multiple levels of group signal status, selection can be based on any of the multiple levels of group signal status. As expected, this type of implementation may require a more intelligent selector in order to decide which group signal status is to be used.

As previously indicated, group signal status may also be used to support switching decisions based on different criteria. In particular, group signal status can be based on any type of parameter (e.g., time-based, quality, etc.) and can be implemented in many different ways. Using quality as an example, group signal status could be determined on a worst-link approach, wherein the group signal status for a particular base rate signal group corresponds to the signal status of the individual base rate signal having the worst quality rating or value in the group. Group signal status may also be computed using an averaging technique, wherein group signal status is determined by averaging the individual statuses for each of the individual base rate signals in the group. In another example, group signal status may be computed based on throughput considerations. It may also be desirable to switch for maximum bandwidth through the various links in a network. In such a case, the group signal status would be computed to account for bandwidth requirements.

In yet another application, the group signal status may be based on only a subset of the individual base rate signals in a particular group, yet the entire group would be switched accordingly. As an example, a system may use several particular channels to carry specialized data, with loss of this data rendering the entire group unusable regardless of the status of the remainder of the group's signals. For this type of application, the group signal status could then be derived based only on these particular channels, but used to effect switching of the entire group. Using SONET as an example, an STS-48 signal group may comprise three (3) STS-12 signals and twelve (12) STS-1 signals. Within the STS-48 group, each of the STS-12 signals may be switched as a group using a group signal status derived therefrom. Of the twelve (12) STS-1 signals, three (3) of the STS-1 signals could be monitored to derive a group signal status that relates specifically to these three particular signals. As such, these three (3) STS-1 signals could be switched as a composite group within the larger STS-48 signal group. These examples are only intended to be illustrative. Accordingly, other specific examples for deriving group signal status that would be apparent to those skilled in the art are contemplated by the invention.

It should also be understood that the particular embodiments and applications described above are only illustrative of the principles of the invention. Those skilled in the art may devise other suitable implementations, without departing from the spirit and scope of the teachings herein, for a number of other applications which may or may not be fabric-based telecommunications applications. For example, the principles of the invention may be employed in a sensor-based system used in automobiles or for an alarm/surveillance system that uses sensors placed at peripheral points along a data path that extends through a facility. Status from the sensors could be combined with the signal and propagated as a group status for appropriate use by a central processing point, such as a control center. The teachings of the invention may also be incorporated in fault isolation, identification and/or segmentation applications in which an embedded group signal status is used to manage faults in a multi-span, serial transmission path carrying higher order signal groups. In general, any application that could benefit from using embedded control would be able to apply the teachings of the invention described herein. Accordingly, the scope of the invention is limited only by the claims that follow.

What is claimed is:

1. A method for switching groups of individual signals, each of the groups including a plurality of individual signals, the method comprising the steps of:
   deriving signal status information for each of the plurality of individual signals;
   computing a group signal status for each of the groups as a function of the signal status information for each of the plurality of individual signals corresponding to each of the groups;
   embedding the group signal status in each of the plurality of individual signals so that the plurality of individual signals in a respective group each carries the same group signal status; and
   independently selecting each of the plurality of individual signals in a respective group as a function of the embedded group signal status so that the plurality of individual signals in a respective group are switched as a composite group.

2. The method of claim 1, wherein the plurality of individual signals are base rate signals and the groups are base rate signal groups, and wherein the step of independently selecting includes the step of selecting each of the plurality of individual signals using an elementary switch fabric having a corresponding plurality of base rate signal selector elements.

3. The method of claim 1, further comprising the steps of:
   computing at least a second group signal status as a function of the group signal statuses computed for a selected plurality of groups; and
   embedding the at least second group signal status in each of the plurality of individual signals corresponding to the selected plurality of groups.

4. The method of claim 3, wherein the group signal status and the at least second group signal status are both carried by each of the plurality of individual signals corresponding to the selected plurality of groups.

5. The method of claim 3, wherein the step of embedding the at least second group signal status includes the step of replacing the group signal status with the at least second group signal status in each of the plurality of individual signals corresponding to the selected plurality of groups.

6. The method of claim 1, further comprising the step of embedding the signal status information for each of the plurality of individual signals, wherein each of the plurality of individual signals is capable of carrying its own signal status information along with its respective group signal status.

7. The method of claim 6, further comprising the step of multiplexing at least two of the groups into a single, higher capacity group, wherein the step of computing a group signal status includes computing a multiplexed group signal status, and wherein each of the plurality of individual signals within the multiplexed group is capable of carrying its own signal status information, its respective group signal status, and the multiplexed group signal status.

8. The method of claim 1, further comprising the steps of:
   inserting a manual command request in at least one of the plurality of individual signals in a respective group; and
   embedding the manual command request in any remaining individual signals in the respective group, wherein each of the plurality of individual signals in the respective group is responsive to the manual command request.

9. The method of claim 1, wherein the step of computing a group signal status comprises the step of computing the group signal status from one of the plurality of individual group signals having the lowest signal status value relative to the other individual signals in a respective group.

10. The method of claim 1, wherein the step of computing a group signal status comprises the step of averaging signal statuses for each of the plurality of individual signals in a respective group.

11. A method comprising the steps of:
deriving signal status information for each of a plurality of individual signals in a transmission path;
computing a group signal status as a function of the signal status information for each of the plurality of individual signals;
embedding the group signal status in each of the plurality of individual signals so that each of the plurality of individual signals carries the same group signal status along the transmission path;
extracting the group signal status at any point within the transmission path; and
actuating a control decision based on the group signal status.

12. The method of claim 11, further comprising the step of embedding the signal status information in each of the plurality of individual signals, wherein each of the plurality of individual signals is capable of carrying its own signal status information along with the group signal status.

13. An apparatus for switching groups of individual signals in an elementary switch fabric having a plurality of signal selector elements, each of the groups including a plurality of individual signals, the apparatus comprising:
means for monitoring the plurality of individual signals to derive signal status information for each of the plurality of individual signals;
means for computing a group signal status for each of the groups as a function of the signal status information for each of the plurality of individual signals corresponding to each of the groups;
means for embedding the group signal status in each of the plurality of individual signals so that each of the plurality of individual signals in a respective group carries the same group signal status; and
means, responsive to the group signal status carried by each of the plurality of individual signals, for generating a control signal, the plurality of signal selector elements being responsive to the control signal,
wherein each of the plurality of individual signals in a respective group is independently selected by one of the plurality of signal selector elements, and wherein the plurality of individual signals in a respective group are switched together as a composite group on the basis of at least the group signal status.

14. The apparatus of claim 13, wherein the means for generating a control signal includes control logic corresponding to each of the plurality of signal selector elements for locally receiving the group signal status and supplying the control signal to a corresponding one of the plurality of signal selector elements.

15. The apparatus of claim 13, wherein the plurality of individual signals are base rate signals, the groups are base rate signal groups, and the plurality of signal selector elements are base rate signal selectors.

16. The apparatus of claim 15, wherein the elementary switch fabric is an m×n base rate signal selector switch having m individual base rate signal selector elements capable of switching n base rate signal groups, each of the base rate signal groups having m channels and each of the m individual base rate selector elements corresponding to one of the m channels, wherein each of the m individual base rate selector elements is operative to select one of the base rate signals from one of the n base rate signal groups for its respective channel.

17. The apparatus of claim 13, further comprising:
means for computing at least a second group signal status as a function of the group signal statuses computed for a selected plurality of groups; and
means for embedding the at least second group signal status in each of the plurality of individual signals corresponding to the selected plurality of groups.

18. The apparatus of claim 17, wherein the group signal status and the at least second group signal status are both carried by each of the plurality of individual signals corresponding to the selected plurality of groups.

19. The apparatus of claim 17, wherein the at least second group signal status replaces the group signal status carried by each of the plurality of individual signals corresponding to the selected plurality of groups.

20. The apparatus of claim 17, wherein the means for embedding includes means for embedding the signal status information for each of the plurality of individual signals, wherein each of the plurality of individual signals is capable of carrying its own signal status information along with its respective group signal status.

21. The apparatus of claim 20, wherein the composition of any of the groups is capable of being changed to form a new group, and wherein a new group signal status is computed from the signal status information carried by each of the plurality of individual signals in the new group.

22. The apparatus of claim 20, wherein at least two of the groups are multiplexed into a single, higher capacity group, the means for computing a group signal status including means for computing a multiplexed group signal status, wherein each of the plurality of individual signals within the multiplexed group is capable of carrying its own signal status information, its respective group signal status, and the multiplexed group signal status.

23. The apparatus of claim 13, further comprising:
means for inserting a manual command request in at least one of the plurality of individual signals in a respective group; and
means for embedding the manual command request in any remaining individual signals in the respective group, wherein each of the plurality of individual signals in the respective group is responsive to the manual command request.

24. The apparatus of claim 13, wherein a plurality of individual signals within a particular group are switched with uniform delay.

* * * * *